(12) United States Patent
Ariyoshi et al.

(10) Patent No.: US 8,641,231 B2
(45) Date of Patent: Feb. 4, 2014

(54) LIGHT DIFFUSION LENSES AND LIGHTING FIXTURES HAVING THE SAME

(75) Inventors: Tetsuo Ariyoshi, Osaka (JP); Byeong-hyeon Yu, Seoul (KR); Choul-ho Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 187 days.

(21) Appl. No.: 13/222,694

(22) Filed: Aug. 31, 2011

(65) Prior Publication Data

US 2012/0224367 A1 Sep. 6, 2012

(30) Foreign Application Priority Data

Mar. 3, 2011 (KR) .................. 10-2011-0019107

(51) Int. Cl.
*F21V 1/00* (2006.01)

(52) U.S. Cl.
USPC ....... 362/235; 362/317; 362/249.02; 362/650

(58) Field of Classification Search
USPC ............ 362/246, 244, 650, 294, 249.02, 317, 362/235
See application file for complete search history.

(56) References Cited

U.S. PATENT DOCUMENTS

| 4,698,730 | A * | 10/1987 | Sakai et al. | 362/311.05 |
| 7,465,075 | B2 * | 12/2008 | Chinniah et al. | 362/336 |
| 8,075,165 | B2 * | 12/2011 | Jiang et al. | 362/308 |
| 2004/0208009 | A1 * | 10/2004 | Mardon et al. | 362/373 |
| 2009/0116251 | A1 | 5/2009 | Harbers et al. | |
| 2010/0020540 | A1 | 1/2010 | Tetsuo et al. | |

FOREIGN PATENT DOCUMENTS

| JP | 2002-358806 A | 12/2002 |
| KR | 10-0910112 B1 | 7/2009 |
| KR | 20-2009-0010200 | 10/2009 |
| KR | 10-2010-0081558 A | 7/2010 |

OTHER PUBLICATIONS

Extended European Search Report issued in European Patent Application No. 11181170.9 dated Sep. 4, 2012.
Partial European Search Report issued in application No. 11 18 1170 issued on Jun. 13, 2012.

* cited by examiner

*Primary Examiner* — Evan Dzierzynski
(74) *Attorney, Agent, or Firm* — McDermott Will & Emery LLP

(57) ABSTRACT

A lighting fixture includes: a base; a plurality of optical sources attached on an upper surface of the base to emit light; a heat spreader attached to the base to radiate heat emitted from the plurality of optical sources; and a light diffusion lens disposed on the upper surface of the plurality of optical sources to refract light emitted from the plurality of optical sources and to increase an irradiation angle of light. In the lighting fixture, an irradiation angle of light emitted from an optical source is close to that of a general electric-light bulb and thus a light distribution characteristic of the lighting fixture may be improved.

18 Claims, 7 Drawing Sheets

LIGHT DIFFUSION LENSES AND LIGHTING FIXTURES HAVING THE SAME

CROSS-REFERENCE TO RELATED APPLICATION

This application claims the benefit of Korean Patent Application No. 10-2011-0019107, filed on Mar. 3, 2011, in the Korean Intellectual Property Office, the disclosure of which is incorporated herein in its entirety by reference.

BACKGROUND

1. Field

The present disclosure relates to light diffusion lenses and lighting fixtures including the same, and more particularly, to light diffusion lenses for enlarging an irradiation angle of light emitted from an optical source and lighting fixtures including the same.

2. Description of the Related Art

Currently, lighting fixtures using light-emitting diodes (LEDs) have been released for replacing incandescent lights.

LEDs used in lighting fixtures do not emit light in all directions 360 degrees and instead emit light to the front. Thus, a light distribution characteristic of the LEDs is significantly different from that of a general light.

FIG. 1 is a diagram illustrating a comparison of a light distribution curve of a general lighting fixture and a general light;

Referring to FIG. 1, in the lighting fixture, as an angle increases from 0 degrees, light decreases and is nearly 0 at around 90 degrees. However, in the general light, light does not decrease from 0 to about around 130 degrees and has uniform intensity. This is because light of a filament used in a general electric-light bulb is emitted in all directions 360 degrees, whereas light of the lighting fixture is emitted forward within 120 degrees. That is, an irradiation angle of the lighting fixture is about 120 degrees.

In this regard, when the lighting fixture is used, the optical distribution and visibility of the lighting fixture is significantly different from those of the general electric-light bulb and thus it is hard to supply the lighting fixture to the market.

SUMMARY

Provided are light diffusion lenses which may increase an irradiation angle of light emitted from an optical source and lighting fixtures including the same.

Additional aspects will be set forth in part in the description which follows and, in part, will be apparent from the description, or may be learned by practice of the presented embodiments.

According to an aspect of the present invention, a light diffusion lens includes a body including a center hole at the center thereof penetrating from a lower surface to an upper surface of the body; and a light incident unit depressed from a lower surface of the body to surround the center hole, wherein light is incident on the light incident unit.

According to another aspect of the present invention, a lighting fixture includes: a base; a plurality of optical sources attached on an upper surface of the base to emit light; a heat spreader connected to the base to radiate heat emitted from the plurality of optical sources; and a light diffusion lens disposed on upper surfaces of the plurality of optical sources to refract light emitted from the plurality of optical sources and to increase an irradiation angle of light.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 2:
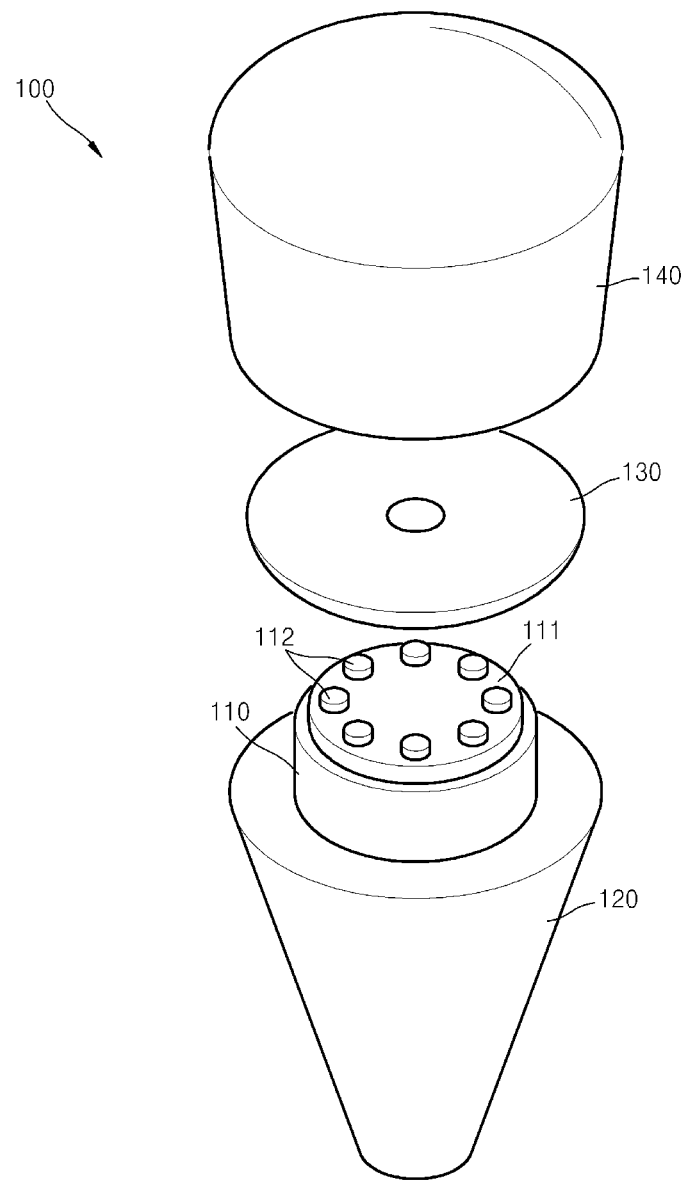
FIG. 2 is a exploded perspective view illustrating a lighting fixture including a light diffusion lens, according to an embodiment of the present invention.
Figure 3:
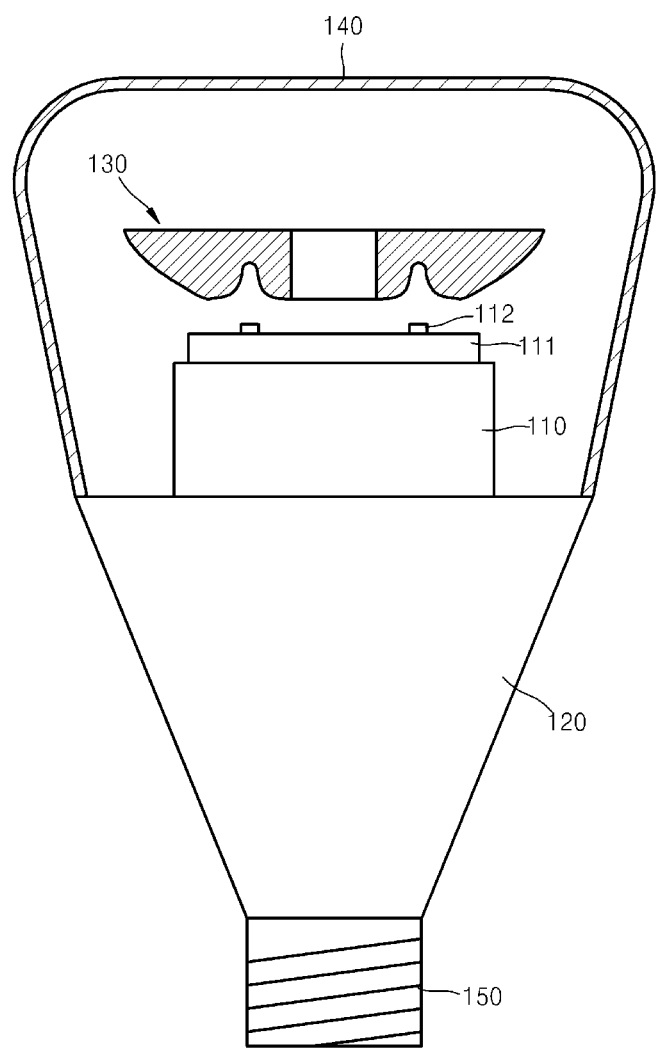
FIG. 3 is a cross-sectional view of the lighting fixture of FIG. 2 including the light diffusion lens of FIG. 2.
Figure 4:
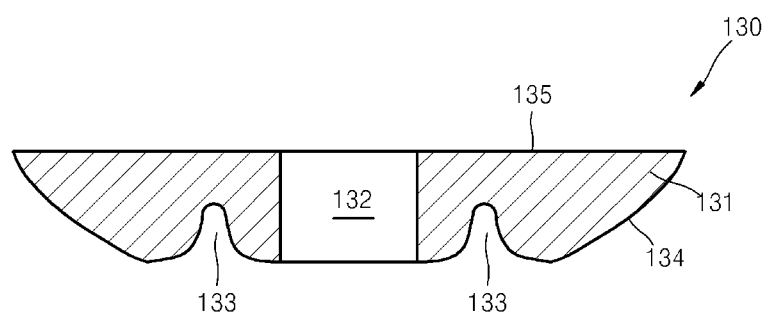
FIG. 4 is a cross-sectional view of the light diffusion lens of FIG. 2, according to an embodiment of the present invention.
Figure 5:
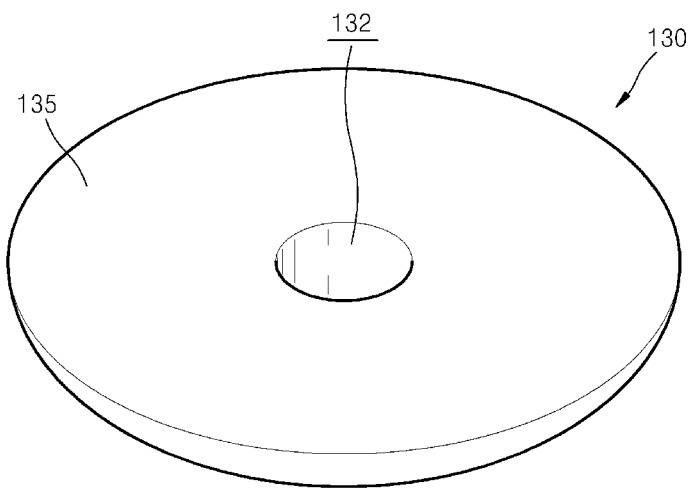
FIG. 5 is a perspective view of the light diffusion lens of FIG. 2 from above.
Figure 6:
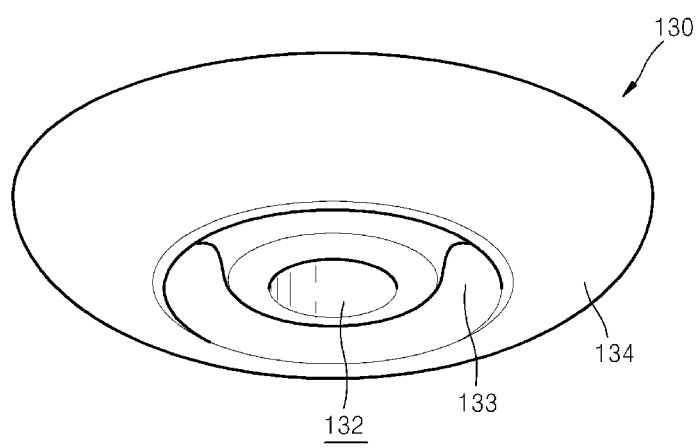
FIG. 6 is a perspective view of the light diffusion lens of FIG. 2 from below.

FIG. 2 is a exploded perspective view illustrating a lighting fixture 100 including a light diffusion lens 130, according to an embodiment of the present invention, FIG. 3 is a cross-sectional view of the lighting fixture 100 of FIG. 2 including the light diffusion lens 130 of FIG. 2, FIG. 4 is a cross-sectional view of the light diffusion lens 130 of FIG. 2 according to an embodiment of the present invention, FIG. 5 is a perspective view of the light diffusion lens 130 of FIG. 2 from above, and FIG. 6 is a perspective view of the light diffusion lens 130 of FIG. 2 from below.

Referring to FIGS. 2 and 3, the lighting fixture 100 is similar in type to a general incandescent bulb and includes a base 110, a plurality of optical sources 112, a heat spreader 120, the light diffusion lens 130, and a cover 140.

The base 110 is attached to the upper surface of the heat spreader 120 and protrudes from the upper surface of the heat spreader 120 by a predetermined height. The base 110 is in a cylindrical form and includes a printed circuit board 111 thereon for controlling the optical sources 112. The form of the base 110 is not limited to the form illustrated in FIGS. 2 and 3 and may vary.

The plurality of optical sources 112 are arranged on the printed circuit board 111 in a round form. Light-emitting diodes may be applied to the optical sources 112.

The heat spreader 120 irradiates heat emitted from the plurality of optical sources 112 to the outside and generally has a structure of a heat sink. A socket 150 connected to a power source (not illustrated) is disposed at the lower surface of the heat spreader 120.

A cross-section of the light diffusion lens 130 is a circle, as illustrated in FIGS. 4 through 6, has a predetermined thickness, and includes a body 131 including a cylindrical-form center hole 132 penetrating from a lower side to an upper side of the light diffusion lens 130 and a light incident unit 133 depressed from the lower side of the body 131 having a ring form to surround the center hole 132, wherein light emitted from the plurality of optical sources 112 is incident on the light incident unit 133. An upper surface 135 of the body 131 is flat, and a side 134 of the body 131 extending from the edge of the upper surface 135 of the body 131 to the light incident unit 133 has a gradually decreased gradient and thus is formed as a curved surface. The light incident unit 133 connecting the center hole 132 to the side 134 of the body 131 is formed as a predetermined curve. Accordingly, the upper surface 135 of the body 131 and the center hole 132 are straight-lined, and the side 134 of the body 131 and the light incident unit 133 are curved-lined. The light diffusion lens 130 is rotationally symmetrical about a center axis (not illustrated) which passes the center hole 132 in a vertical direction.

Although not illustrated in FIGS. 2 and 3, the light diffusion lens 130 may be installed at the upper side of the plurality of optical sources 112 by employing a general structure. The light diffusion lens 130 may be manufactured by injection molding of an optical plastic resin material such as polycarbonate or acryl.

In order for light emitted from the plurality of optical sources 112 to be incident on the light incident unit 133 of the light diffusion lens 130, the plurality of optical sources 112 may be disposed to face the light incident unit 133 of the light diffusion lens 130. Accordingly, the plurality of optical sources 112 are arranged in a ring form so as to correspond to the form of the light incident unit 133 disposed on the printed circuit board 111 in a ring form.

The cover 140 is installed at an upper side of the heat spreader 120, and the base 110, the plurality of optical sources 112, and the light diffusion lens 130 are disposed in the cover 140. A diffusion matter may be coated on the inner surface of the cover 140 or filled in the cover 140 so that the cover 140 may protect the plurality of optical sources 112 and allow light emitted from the plurality of optical sources 112 to diffuse well.

Hereinafter, functions of the light diffusion lens 130 will be described with reference to FIGS. 7 through 9.

Figure 7:
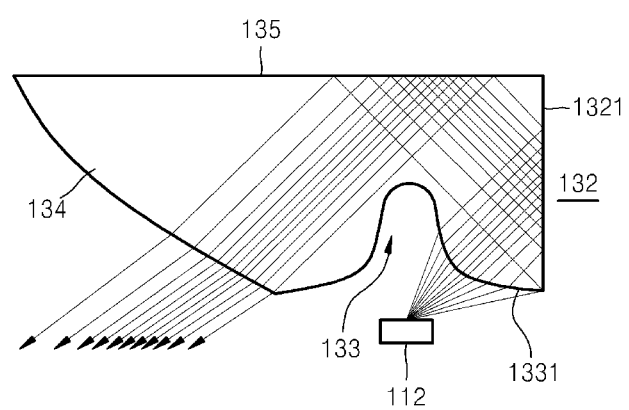
FIGS. 7 through 9 illustrate the diffusion of light performed by the light diffusion lens of FIG. 2.
Figure 8:
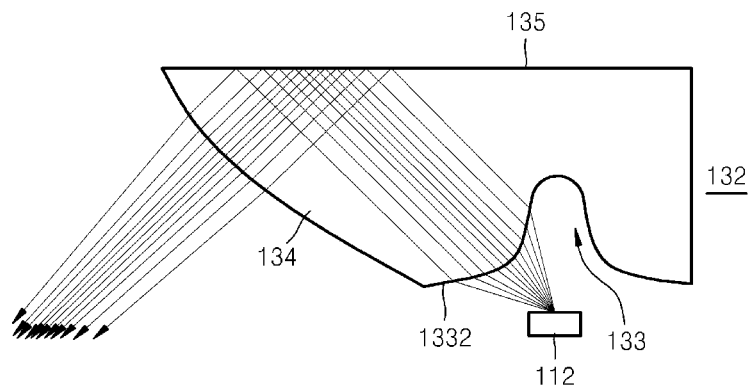
Figure 9:
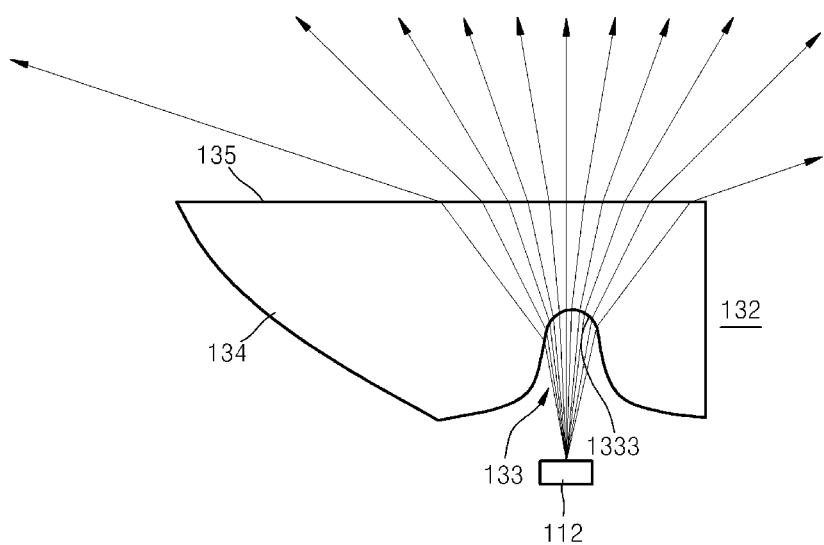

FIGS. 7 through 9 illustrate the diffusion of light performed by the light diffusion lens 130.

Referring to FIG. 7, a part of light emitted from the optical source 112 is incident on the side of the center hole 132 through the light incident unit 133.

A part of light emitted from the optical source 112 is bent at an one side incident surface 1331 of the light incident unit 133 and is incident onto the inside of the light diffusion lens 130 in a direction of about 45 degrees. Light incident onto the inside of the light diffusion lens 130 is totally reflected at a side surface 1321 of the center hole 132 and is totally reflected at the upper surface 135 again, thereby facing the side 134. Light is refracted at the side 134 of the body 131 and is emitted to the outside of the light diffusion lens 130.

Referring to FIG. 8, a part of light emitted from the optical source 112 is incident on the side 134 of the body 131 through the light incident unit 133.

A part of light emitted from the optical source 112 is bent at another side incident surface 1332 of the light incident unit 133 and is incident onto the inside of the light diffusion lens 130 in a direction of about 45 degrees. Light incident onto the inside of the light diffusion lens 130 is totally reflected at the upper surface 135 of the body 131, thereby facing the side 134 of the body 131. Light is refracted at the side 134 of the body 131 and is emitted to the outside of the light diffusion lens 130. Accordingly, a part of light emitted from the optical source 112 is totally reflected while passing through the inside of the body 131 of the light diffusion lens 130 and is emitted to a lower side of the light diffusion lens 130 so that an irradiation angle increases.

Referring to FIG. 9, a part of light emitted from the optical source 112 is incident on the upper side 135 of the body 131 through the light incident unit 133.

A part of light emitted from the optical source 112 is refracted while passing through a center incident surface 1333 of the light incident unit 133 and refracted at an increased angle while passing through the upper surface 135 of the light diffusion lens 130 so that light is diffused to the outside. Accordingly, a part of light emitted from the optical source 112 is refracted while passing through the upper surface 135 of the light diffusion lens 130 and thus an irradiation angle increases.

Consequently, an irradiation angle of light emitted to the front and the side increases while light emitted from the optical source 112 passes the light diffusion lens 130.

Figure 10:
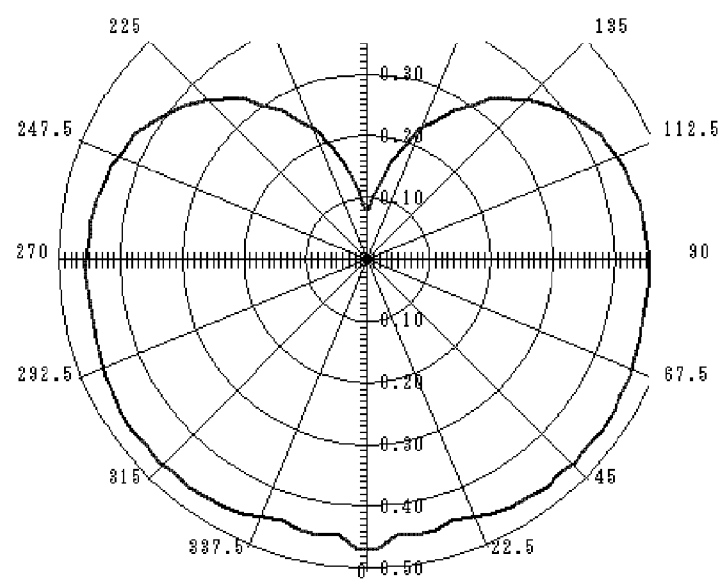
FIG. 10 illustrates a light distribution curve of a lighting fixture including the light diffusion lens of FIG. 2.

FIG. 10 illustrates a light distribution curve of a lighting fixture including the light diffusion lens 130.

Figure 1:
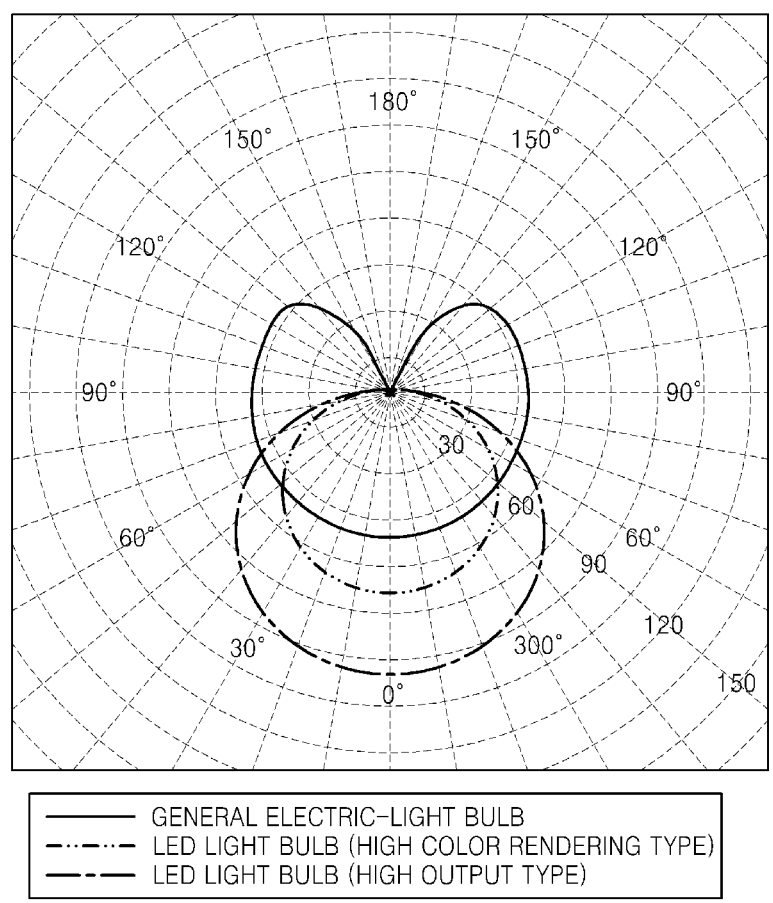
FIG. 1 is a diagram illustrating a comparison of a light distribution curve of a general lighting fixture and a general light.

Referring to FIG. 10, a part represented by a solid line is an irradiation angle measured by using the light diffusion lens 130 of FIG. 2. The irradiation angle of an optical source according to the present invention is 310 degrees, which is significantly greater compared with 130 degrees, which is a general irradiation angle of light illustrated in FIG. 1. Accordingly, when a light diffusion lens according to the present invention is used, a light distribution characteristic of a lighting fixture may be close to that of a general electric-light bulb.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A light diffusion lens comprising:
    a body comprising a center hole at the center thereof penetrating from a lower surface to an upper surface of the body; and
    a light incident unit depressed from a lower surface of the body to surround the center hole, wherein light is incident on the light incident unit.

2. The light diffusion lens of claim 1, wherein an upper surface of the body is flat and a side of the body is formed as a curved surface inclined at a predetermined angle from the upper surface of the body to the light incident unit.

3. The light diffusion lens of claim 2, wherein the center hole is in a cylindrical form.

4. The light diffusion lens of claim 1, wherein the light incident unit is rotationally symmetrical about an axis which passes the center hole in a vertical direction.

5. The light diffusion lens of claim 4, wherein the light incident unit is in a ring form.

6. The light diffusion lens of claim 1, wherein the light diffusion lens is manufactured using an optical plastic resin material such as polycarbonate or acryl.

7. The light diffusion lens of claim 1,
    wherein the upper surface of the body is flat and a side of the body is formed as a curved surface inclined at a predetermined angle from the upper surface of the body to the light incident unit, and
    wherein the light incident unit is rotationally symmetrical about an axis which passes the center hole in a vertical direction.

8. A lighting fixture, comprising:
    a base;
    a plurality of optical sources attached on an upper surface of the base;
    a heat spreader connected to the base to radiate heat emitted from the plurality of optical sources; and a light diffusion lens disposed on upper surfaces of the plurality of optical sources and having a light incident unit depressed from a lower side of the light diffusion lens, wherein the plurality of optical sources are arranged corresponding to a shape of the light incident unit such that light emitted from the plurality of optical sources is refracted and an irradiation angle of light emitted from the plurality of optical sources is increased.

9. The lighting fixture of claim 8, further comprising a cover attached to the heat spreader to surround and protect the optical sources and the light diffusion lens.

10. The lighting fixture of claim 8, wherein the light diffusion lens includes an optical plastic resin material selected from the group consisting of polycarbonate and acryl.

11. The lighting fixture of claim 8, wherein the optical sources include a light-emitting diode (LED).

12. A lighting fixture comprising:
a base;
a plurality of optical sources attached on an upper surface of the base to emit light;
a heat spreader connected to the base to radiate heat emitted from the plurality of optical sources; and
a light diffusion lens disposed on upper surfaces of the plurality of optical sources to refract light emitted from the plurality of optical sources and to increase an irradiation angle of light, wherein:
the light diffusion lens comprises:
  a body comprising a center hole at the center thereof penetrating from a lower surface to an upper surface of the body; and
  a light incident unit depressed from the lower side of the body of the light diffusion lens to surround the center hole, and
light is incident on the light incident unit.

13. The lighting fixture of claim 12, wherein the upper surface of the body of the light diffusion lens is flat and a side of the body of the light diffusion lens has a curved surface inclined at a predetermined angle from the upper surface of the body to the light incident unit.

14. The lighting fixture of claim 12, wherein the light incident unit has a ring shape.

15. The lighting fixture of claim 14, wherein the plurality of optical sources are arranged in a ring shape to face the light incident unit.

16. The lighting fixture of claim 12, wherein the center hole has a cylindrical shape.

17. The lighting fixture of claim 12, wherein the light incident unit is rotationally symmetrical about an axis which passes the center hole in a vertical direction.

18. The lighting fixture of claim 12,
wherein the upper surface of the body of the light diffusion lens is flat and a side of the body is formed as a curved surface inclined at a predetermined angle from the upper surface of the body to the light incident unit, and
wherein the light incident unit of the light diffusion lens is rotationally symmetrical about an axis which passes the center hole in a vertical direction.

* * * * *